United States Patent [19]
Kraemer et al.

[11] Patent Number: 5,472,141
[45] Date of Patent: Dec. 5, 1995

[54] HIGH EFFICIENCY GAS FURNACE

[75] Inventors: William E. Kraemer, Sterling Heights; Manouchehr Daneshvar, Novi, both of Mich.

[73] Assignee: Combustion Concepts, Inc., Detroit, Mich.

[21] Appl. No.: 189,207

[22] Filed: Jan. 31, 1994

Related U.S. Application Data

[63] Continuation-in-part of Ser. No. 983,885, Dec. 1, 1992, Pat. No. 5,282,457.

[51] Int. Cl.$^6$ .................................................. F24H 3/02
[52] U.S. Cl. ............................... 236/91 R; 126/110 C
[58] Field of Search ........................ 126/110 C, 116 A; 431/12; 236/11, 15 BD, 91

[56] References Cited

U.S. PATENT DOCUMENTS

| | | | |
|---|---|---|---|
| 545,296 | 8/1895 | Kintner | 237/53 X |
| 2,060,169 | 11/1936 | Bubar | 55/447 X |
| 2,543,201 | 2/1951 | Rifley | 126/102 X |
| 3,209,731 | 10/1965 | Schonberger et al. | 122/459 |
| 3,219,027 | 11/1965 | Roche | 239/132 |
| 3,760,791 | 9/1973 | Schlies et al. | 126/110 R |
| 3,795,476 | 3/1974 | Nelson | 431/90 |
| 3,815,336 | 6/1974 | Rigo | 55/269 |
| 3,844,270 | 10/1974 | Black | 126/110 R |
| 3,967,590 | 7/1976 | Hays et al. | 431/62 |
| 4,256,082 | 3/1981 | Scholten et al. | 126/110 AA |
| 4,275,705 | 6/1981 | Schaus et al. | 126/110 R |
| 4,308,990 | 1/1982 | Boravina et al. | 236/10 |
| 4,309,977 | 1/1982 | Kitchen | 126/99 A |
| 4,319,557 | 3/1982 | Sietmann et al. | 126/77 X |
| 4,333,524 | 6/1982 | Elkins et al. | 165/104.16 |
| 4,449,511 | 5/1984 | Hays et al. | 126/110 R |
| 4,475,621 | 10/1984 | Cherington et al. | 126/110 R X |
| 4,479,482 | 10/1984 | Cherington | 126/99 R |
| 4,492,562 | 1/1985 | Michel | 431/177 |
| 4,494,598 | 1/1985 | DeHaan et al. | 165/47 |
| 4,503,902 | 3/1985 | Zolik | 165/47 |
| 4,550,773 | 11/1985 | Martin | 165/54 |
| 4,568,264 | 2/1986 | Mullen et al. | 431/1 |
| 4,569,310 | 2/1986 | Davis | 122/24 |
| 4,619,604 | 10/1986 | Pickering | 431/353 |
| 4,629,413 | 12/1986 | Michelson et al. | 431/9 |
| 4,651,712 | 3/1987 | Davis | 126/110 R |
| 4,669,656 | 6/1987 | Turko | 237/53 |
| 4,688,547 | 8/1987 | Ballard et al. | 126/116 A |
| 4,706,881 | 11/1987 | Ballard | 236/15 BD |
| 4,729,207 | 3/1988 | Dempsey et al. | 126/112 |
| 4,738,307 | 4/1988 | Bentley | 165/133 |
| 4,759,312 | 7/1988 | Pletzer | 122/24 |
| 4,776,320 | 10/1988 | Ripka et al. | 126/99 A |
| 4,780,076 | 10/1988 | Davis | 431/1 |
| 4,807,588 | 2/1989 | Bentley et al. | 126/110 R |
| 4,830,600 | 5/1989 | VerShaw et al. | 431/8 |
| 4,848,314 | 7/1989 | Bentley | 126/116 R |
| 4,856,550 | 8/1989 | Smelcer | 137/192 |
| 4,891,004 | 1/1990 | Ballard et al. | 431/6 |
| 4,896,411 | 1/1990 | Dempsey | 29/157.3 D |
| 4,904,179 | 2/1990 | Drago et al. | 431/2 |
| 4,924,848 | 5/1990 | Vaughn | 126/110 AA |
| 4,945,890 | 8/1990 | Ripka | 126/110 R |
| 4,947,548 | 8/1990 | Bentley | 29/458 X |
| 5,042,453 | 8/1991 | Shellenberger | 126/110 R |
| 5,178,124 | 1/1993 | Lu et al. | 126/110 R |
| 5,282,457 | 2/1994 | Kraemer et al. | 126/110 C |

*Primary Examiner*—William E. Wayner
*Attorney, Agent, or Firm*—Harness, Dickey & Pierce

[57] ABSTRACT

A high efficiency gas furnace utilizes a unique pre-mix design in combination with a pressurized/high velocity combustion process. The combustion process occurs in a combustion chamber and the high temperature high velocity products of combustion follow a circuitous route from the combustion chamber through finned tubular conduits to an exhaust. Heat from the high temperature high velocity products is transferred to the finned tubular conduits. An air blower assembly forces air across the finned tubular conduits and the combustion chamber to remove the heat from the finned tubular conduits and transfers this heat to a building or an enclosed portion thereof.

19 Claims, 9 Drawing Sheets

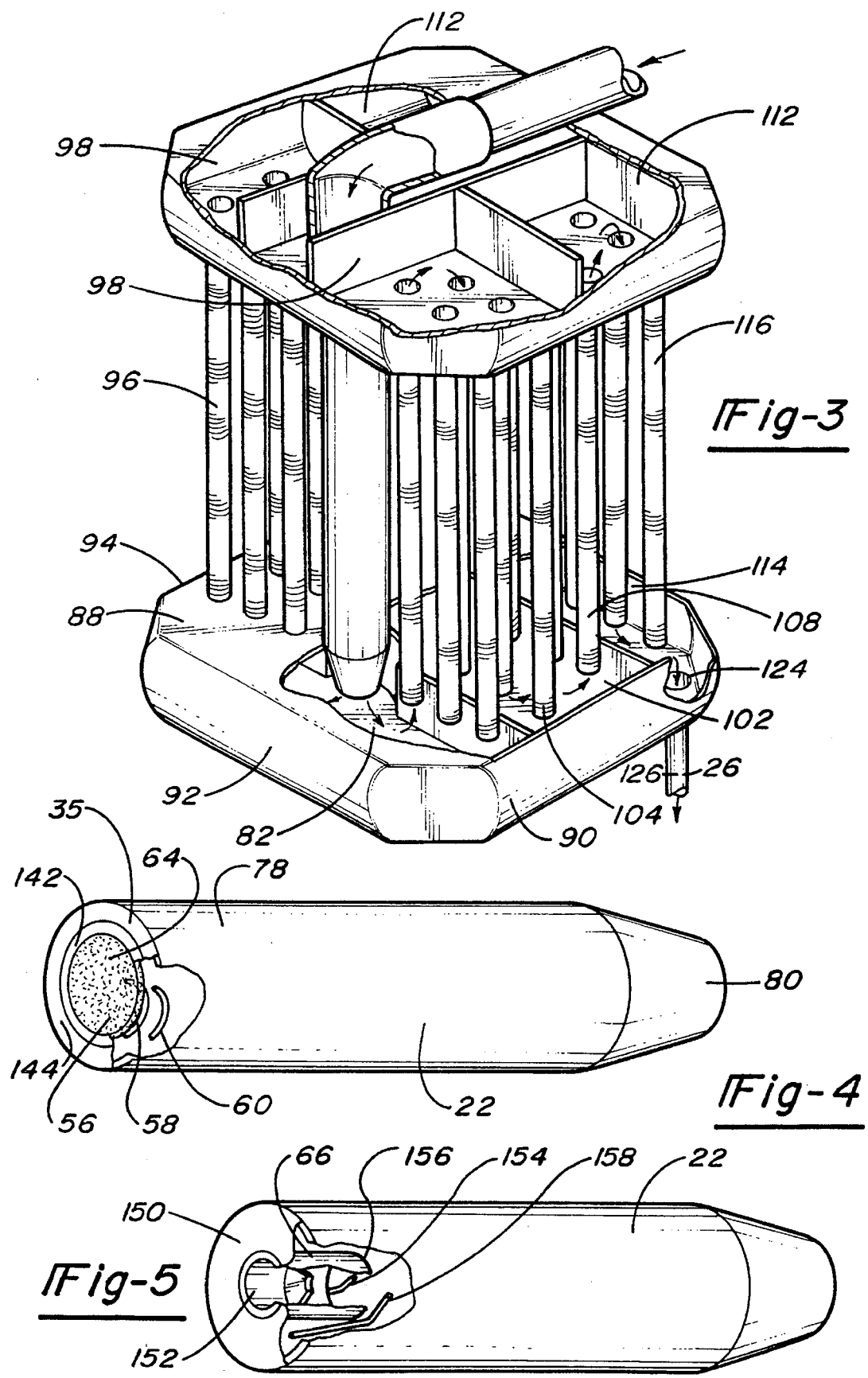

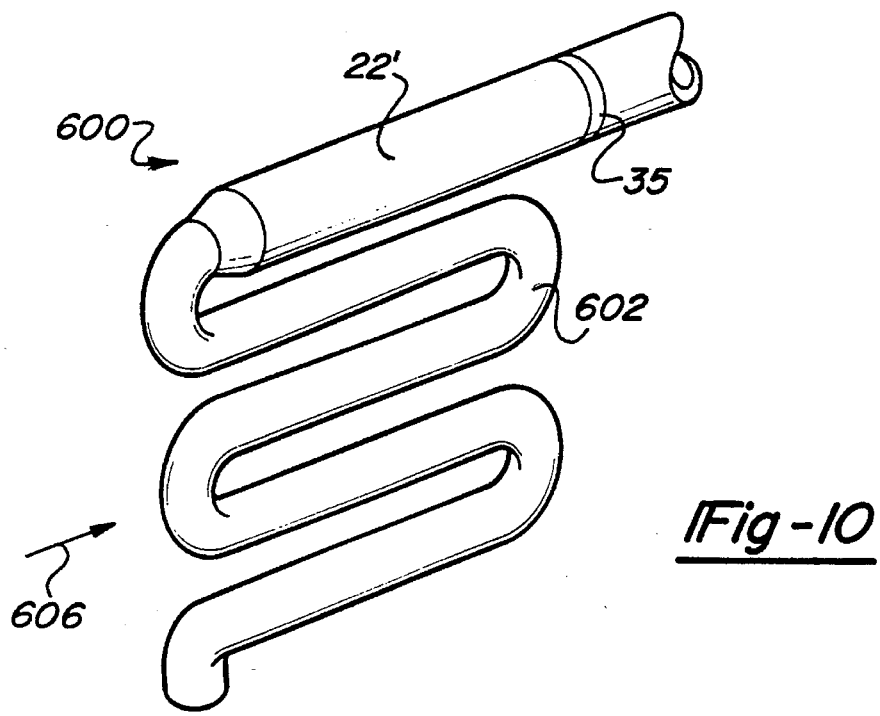
_Fig-10_
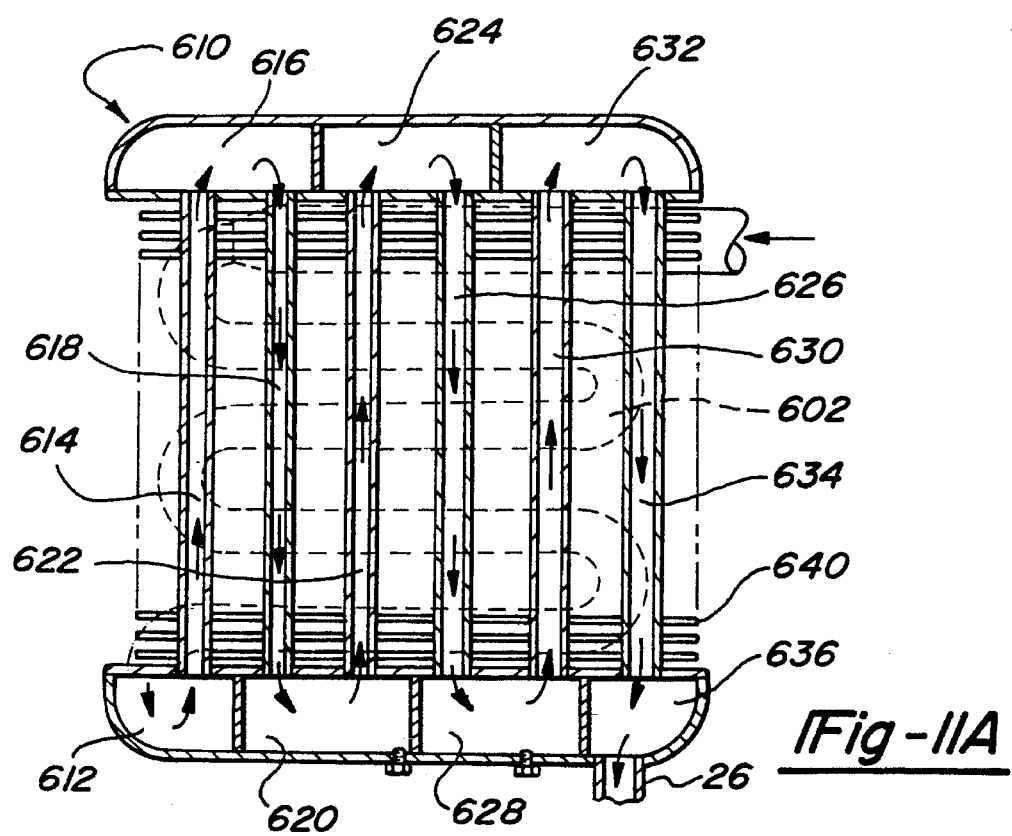
_Fig-11A_

HIGH EFFICIENCY GAS FURNACE

This is a continuation-in-part of application Ser. No. 07/983,885 filed Dec. 1, 1992, now U.S. Pat. No. 5,282,457.

FIELD OF THE INVENTION

The present invention relates to heating systems which are used to heat space within a building or an enclosed portion thereof. More particularly, this invention relates to heating systems of the forced air type and/or of the liquid or boiler type.

BACKGROUND AND SUMMARY OF THE INVENTION

Prior art forced air/boiler furnaces used in residential and commercial buildings or for enclosed portions thereof are relatively large in size, have poor emission levels, have low thermal efficiency, often require large exhaust systems such as a chimney and are therefore impractical for a number of applications.

The low thermal efficiency of prior art furnaces when using the usable fuel gas, oil or any other combustible material is well documented. Most prior art furnaces have efficiency levels of less than 75% and require large exhaust systems such as a chimney to remove the undesirable products of combustion to the outside atmosphere. Chimneys often exit the products of combustion at temperatures well above 300° F. The more recent "High Efficiency" designs of furnaces have addressed this issue to the extent practical by utilizing existing technology. These high efficiency units employ a draw fan motor to extract the products of combustion from a larger surface area heat exchanger and thereby do not require a chimney. In place of the chimney, the high efficiency furnaces have an exhaust pipe of between 2" and 6" in diameter to dispose of the toxic products of combustion to the outside atmosphere. These newer designed high efficiency furnaces have thermal efficiency of up to 90% but they do not address all of the thermal efficiency issues.

When addressing overall thermal efficiency one issue which needs to be addressed is the source of combustion air. Prior art furnaces draw the combustion air from inside the building or dwelling being heated. This requires a greater volume of air to be heated and thereby reduces overall thermal efficiency. The newer high efficiency designs have addressed this issue by drawing outside air via a tube/pipe for the combustion process.

One of the last issues within the efficiency area which needs to be addressed is the number of on/off cycles. In the Northern areas of the United States and Canada, there can be up to 20,000 such on/off cycles per year. Each on/off cycle creates an unsteady state inefficiency at the start of the cycle which continues until steady state conditions are achieved. A heating unit which could fire over a wider firing range would significantly reduce the number of such on/off cycles and thereby improve the overall thermal efficiency. Likewise, the number of on/off cycles can be directly related to the durability of the unit. By reducing the number of on/off cycles per year, the life expectancy of the heating unit can be significantly increased.

The invention presented here addresses the above efficiency issues by utilizing a unique premix design in combination with a pressurized/high velocity combustion process to provide a variable firing rate which utilizes outside air for the combustion process and requires no exhaust draw fan motor. This furnace displays thermal efficiency levels of 95% and greater and requires an exhaust pipe of less than 1" in diameter. The multi-firing rates and unique process control system within the present invention enables the unit to maximize overall thermal efficiency.

The second area addressed by the present invention deals with the quality of the emissions from the combustion process. Prior art furnaces do not address emission levels and the new "High Efficiency" designs focus on improving efficiency levels with little or no concern for emission levels. Some of the most recent designs of prior art furnaces have attempted to reduce emissions by using a small amount of excess air to reduce the flame temperature and thereby reduce the NOx emission levels. The present invention addresses the quality of emissions issued through its uniquely designed premix system which results in a more efficient mixing of the reactants and thus results in the combustion process going to completion. The high velocity/super atmospheric pre-mixture also results in increasing the rate of combustion and thereby significantly lowering the formation of NOx. The present invention also uses excess air within the combustion process to further improve the emission levels.

The third area addressed by the present invention is the physical size and weight of the heating unit. Prior art furnaces of both the convention and the high efficiency design utilize a relatively large amount of space and are excessively heavy and bulky. The size/weight issue with the prior art furnaces makes certain applications impractical when combined with the flue exhaust requirements of a chimney or larger diameter pipe. These flue exhaust requirements make it impractical in many apartment and commercial buildings to use the high efficiency furnaces. As a result, these apartment and commercial buildings must go to the costlier less thermal efficient electric heaters. The present invention utilizes a very high convective heat transfer process which makes the unit considerably smaller and more compact. The furnace in the present invention is not only compact but it is insensitive to its placement enabling the same unit be placed in a horizontal or vertical position. The present invention requires an exhaust tube/pipe of less than 1" in diameter which can be of a flexible design to accommodate a variety of routing configurations. The high efficiency gas furnace of the present invention being light weight, compact and requiring a small exhaust tube/pipe enable it to be installed inside closets, cupboards or similar type spaces.

BRIEF DESCRIPTION OF THE DRAWINGS

The above mentioned and other features and objectives of this invention and the manner of attaining them will become more apparent and the invention itself will be better understood by reference to the following description of the invention taken in conjunction with the accompanying drawings wherein:

FIG. 3 is a partially cut away perspective view of the heat exchanger of the furnace shown in FIG. 1;

FIG. 4 is a perspective view of a surface combustion burner for use in the furnace of the present invention;

FIG. 5 is a perspective view of a high pressure jet burner for use in the furnace of the present invention;

FIG. 10 is a perspective view of a burner assembly according to another embodiment of the present invention;

FIG. 11A is a side elevational cross section of the heat exchanger shown in FIG. 10.

DETAILED DESCRIPTION OF THE PREFERRED EMBODIMENTS

Figure 1:
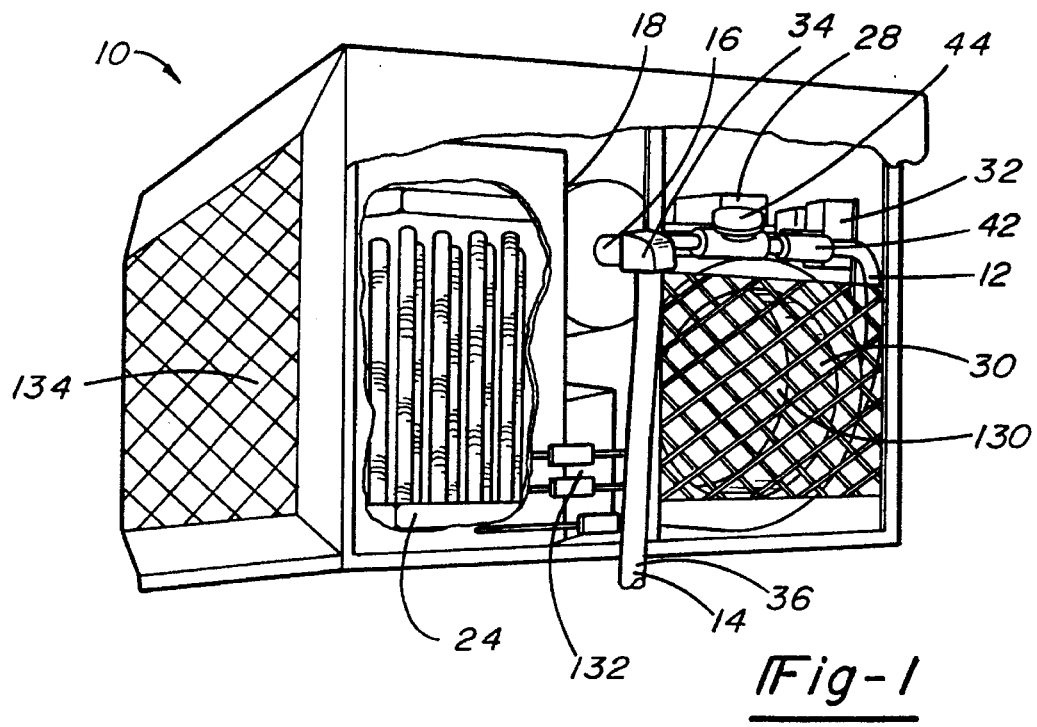
FIG. 1 is a partially cut away perspective view of a furnace in accordance with the present invention.

Referring now to the drawings in which like reference numerals designate like or corresponding pans through the several views, there is shown in FIG. 1 a high efficiency gas furnace for use in heating space within a building and/or a residence or an enclosed portion thereof and is designated generally by the reference numeral 10.

High efficiency gas furnace 10 is comprised of a fuel supply system 12, an air supply system 14, a mixing unit 16, a compressor system 18, a burner system 20, a combustion chamber 22, a heat exchanger system 24, an exhaust 26, a central control unit 28, an air blower/assembly system 30 and a control/safety system 32.

Air is supplied to furnace 10 through air supply system 14. Air supply system 14 provides air to mixing unit 16 through an inlet 34 which normally communicates with the outside atmosphere of the building or dwelling via a pipe/tubing 36 to draw in outside air for the combustion process. Inlet 34 can also communicate with the atmosphere of the building or dwelling and draw combustion air from within the building or dwelling. The incoming fresh air and/or preheated fresh air travels through an air filter 38. The size and type of air filter will depend on various parameters including compressor requirements and the incoming air quality. Air filter 38 will remove unwanted dust and other contaminating particles from the air stream and thereby protect mixing unit 16, compressor system 18 and burner system 20. A metering control valve 40 is connected to inlet 34 after filter 38 and prior to mixing unit 16. This control valve 40 allows the proper volume of air to enter mixing unit 16, compressor system 18 and burner system 20 to support dean and efficient combustion at the predetermined firing rate.

Fuel supply system 12 will normally be supplied from a directly piped supply (not shown) such as from a natural gas distribution company, or from storage tanks. Preferably, the fuel gas would be natural gas but it could be any other suitable fuel gas, such as propane. The fuel gas is piped to the inlet side of a regulator 42 which controls and ensures that a non-pulsating flow of fuel gas is supplied to a gas metering valve 44. Gas metering valve or orifice 44 controls the volumetric flow of fuel gas that goes to mixing unit 16, which supports the combustion process for the firing rate which is determined by central control unit 28 which communicates with gas metering valve 44. The inlet end of gas metering control valve 44 communicates with the exit end of regulator 42 and the outlet end of gas metering control valve 44 communicates with the inlet end of mixing unit 16.

The combustion air inlet orifice or metering control valve 40 and fuel gas metering control valve 44 are in communication with central control unit 28 ensuring that the correct predetermined amount/ratio of air and fuel gas is being supplied to mixing unit 16. Mixing unit 16 mixes the two gasses to form a combustible gas pre-mixture, and then presents the gas pre-mixture to the demand or input side 46 of compressor system 18. The combination of the suction from compressor system 18 and the design of mixing unit 16 results in a thorough mixing of the air and fuel gas.

Metering control valve 44 and metering control valve 40 provide for a variable firing rate of burner system 20. When it is desired to have a fixed rate of combustion for burner system 20, metering control valve 44 and metering control vane 40 can both be replaced with orifices.

The compressor system 18 has input side 46 which leads to a compressor 48 which increases the pressure of the combustion pre-mixture to provide combustible gasses to burner system 20 at super atmospheric pressure. Preferably and in accordance with the present invention, this pressure would be between one and fifteen PSIG. As will be discussed herein compressor 48 can be a multistage blower assembly or a compressing unit. Compressor 48 described herein will achieve the required outlet pressure and have the desired output flow to support the operating conditions of the present invention. The size and type of compressor is well known to those versed in the art and will be determined by the demand or capacity of the particular high efficiency gas furnace 10. The outlet or pressure side of compressor 48 communicates with the burner system 20 via a connection line 50. Within connection line 50 is a pressure sensing device 52 which communicates with central control unit 28 and control/safety system 32 to terminate the supply of fuel gas and thereby terminate the combustion process should a pressure loss occur or should the pressure exceed a predetermined level. Pressure sensor 52 is one of several safety devices within this high efficiency gas furnace 10.

Air filter 38, fuel gas regulator 42, fuel gas metering valve 44, air metering control valve 40, compressor 48 and pressure sensor 52 are all commercially available items and are well known in the art.

The super atmospheric pre-mix is supplied to burner system 20 via connection line 50 and communicates with burner assembly 35. Burner assembly 35 includes a burner element 56, an ignition source 58 for combusting the fuel gas/air premixture and a safety flame sensor 60 to ensure proper combustion occurs and is maintained. Burner assembly 35 operates by receiving and igniting the high velocity/pressurized gas pre-mixture with minimal pressure loss through burner element 56. As will be discussed herein, the burner assembly 35 can be comprised of a porous fiber metallic burner 64 or a jet nozzle burner 66 design. Each burner assembly 35 described herein will achieve the required flame stability, have a desired pressure drop, and operate under various operating conditions of the present invention.

The high velocity flame emanating from burner assembly 35 will be contained and the combustion reaction will be allowed to go to completion within the insulated cylindrically designed combustion chamber 22. Combustion chamber 22 is preferably 2" to 5" in diameter depending on the designed firing range and the furnace configuration. Combustion chamber 22 extends from the top plate 84 of heat exchanger upper section 98 to the bottom plate 68 of heat exchanger lower section 82. Combustion chamber 22 has a layer of insulating material 74 which is preferably between ⅛" thick to ½" thick depending on the designed firing range and the furnace configuration. Insulating material 74 starts at the top of chamber 22 and is attached to the inside wall 76 of combustion chamber 22. The insulation begins at the intersection of the combustion chamber 22 and burner assembly 35 and continues along the entire length of combustion chamber 22. Combustion chamber 22 is tapered from its top 78 to its bottom 80. The taper is such that the bottom diameter of combustion chamber 22 is approximately 50% of the top diameter of combustion chamber 22. The tapered design and insulation of combustion chamber 22 is necessary to ensure that the combustion process goes to completion in an efficient manner while producing a minimum level of pollutants, to ensure that the resultant heat can be used in an efficient manner to heat the required space and to ensure that the pressurized combustion process occurs at the lowest possible noise level.

Figure 3A:
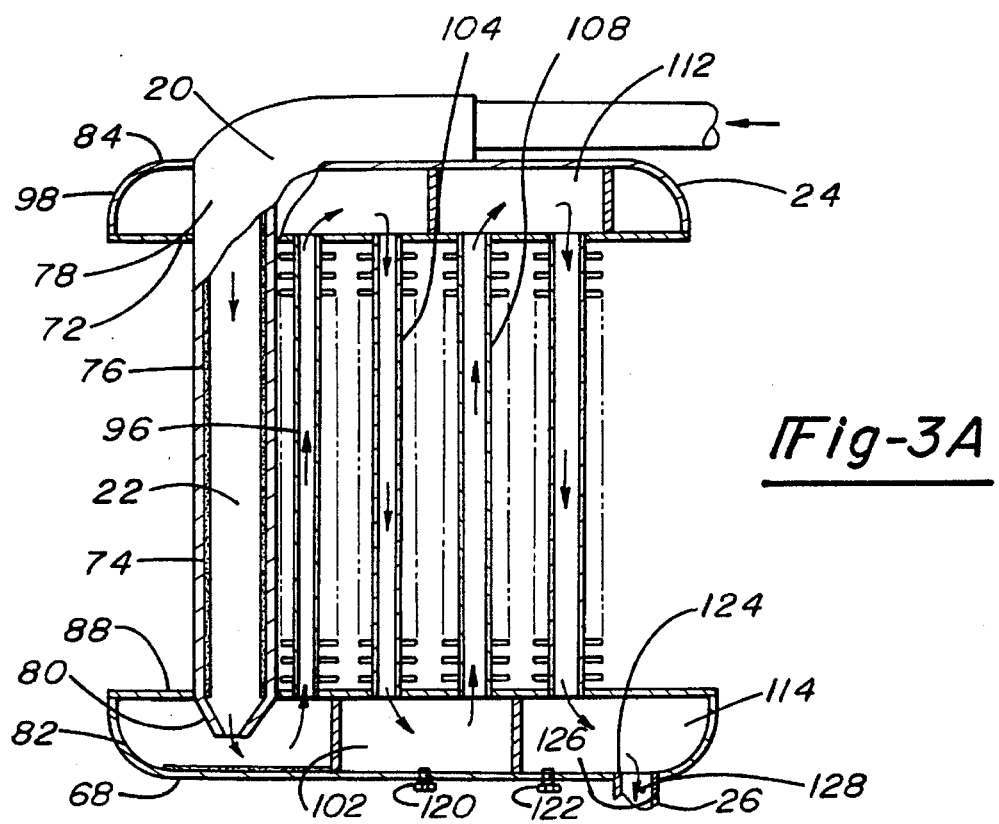
FIG. 3A is a side elevation cross section of the heat exchanger shown in FIG. 3.
Figure 2:
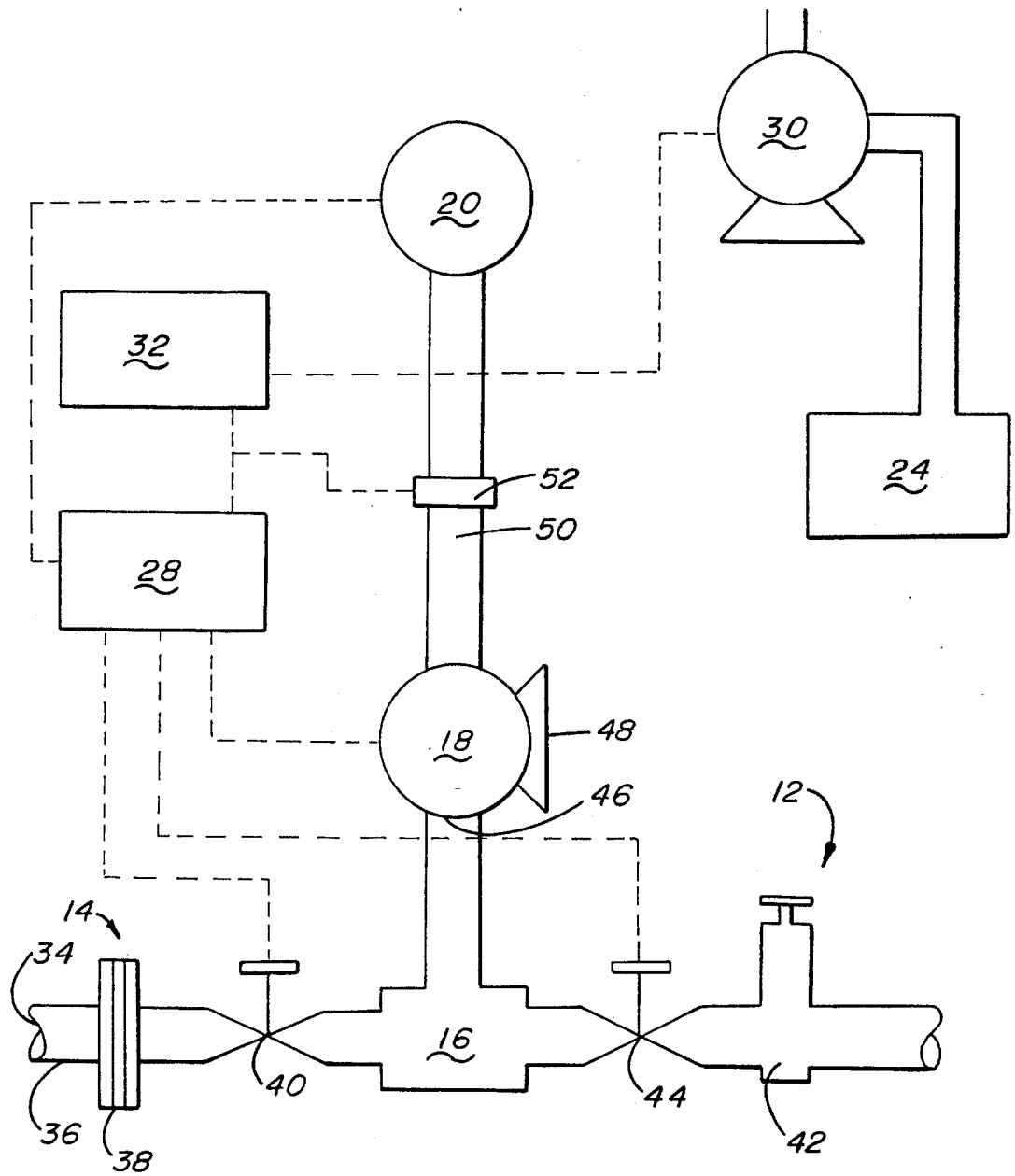
FIG. 2 is a schematic view of the elements of the furnace of the present invention.

The high velocity products of combustion exiting combustion chamber 22 enter into the first section 82 of heat exchanger system 24. Heat exchanger section 82 has insulating material attached to its bottom wall 68 to avoid creating hot spots. The high convective heat transfer rate of the super atmospheric products of combustion transfer heat energy to the top wall 88 and outside walls 90, 92 and 94 which communicate with the forced air flow from air blower assembly 30. The high velocity products of combustion then travel up through a series of finned or bared tubes/pipes 96. For purposes of clarity, the fins have not been shown in FIG. 3, the perspective view, but are shown in FIG. 3A, the sectional view. This is also the case for FIGS. 6 and 6A and for FIGS. 7 and 7A. Finned or bared tubes/pipes 96 communicate at their entrance end with heat exchanger section 82 at wall 88 and at the exit end with heat exchanger section 98 at wall 72. The high convective heat transfer mechanism transfers the heat energy from the high velocity products of combustion to the walls and/or to the extended surfaces of the finned or bared tubes/pipes 96 which efficiently transfer the heat to the air flow emanating from the air blower assembly 30 and moving over heat exchanger system 24. The high velocity products of combustion then flow downward from heat exchanger section 98 into a second set of finned tube/pipes 104 towards heat exchanger section 102. The high velocity products of combustion then flow from heat exchanger section 102 upward through still another set of finned or bared tubes/pipes 108 to heat exchanger section 112 and finally the high velocity products of combustion travel downward from heat exchanger section 112 towards heat exchanger section 114 via a final set of finned tube/pipes 116. Heat exchanger section 114 communicates with exhaust 26 for exiting the products of combustion to the outside atmosphere. The high velocity/high convective heat transfer rate of the products of combustion flowing from combustion chamber 22 through heat exchanger system 24 in a cross flow pattern enabling the heat exchanger system 24 to be very compact and efficient. Heat exchanger sections 102 and 114 are tapered to one side and have a drainage mechanism 120 and 122 where condensate will be trapped and removed from the unit. Drainage mechanisms 120 and 122 can be the type which accumulates a predetermined amount of liquid prior to draining the liquid. Another drainage mechanism 120 and 122 can be direct drains connected to the exhaust tube enabling the condensate to be drained off via the exhaust. These liquid type of drainage mechanisms are well known in the art.

Heat exchanger section 114 connects to exhaust 26 at 124. The high velocity/super atmospheric products of combustion are exhausted through a small diameter pipe or tubing 126 to the outside of the building or dwelling. One end of the pipe or tubing 126 communicates with heat exchanger section 114 and the other end with the outside atmosphere. Within the exhaust pipe or tubing at connection 124 of heat exchanger section 114 a pressure sensor 128 resides and communicates with the central control unit 28 and control/safety unit 32 to shut off the supply of fuel gas should there be a change in the system's pressure. The high velocity/super atmospheric low temperature products of combustion can travel through small diameter pipe or flexible tubing 126 and thereby greatly enhance the ease and flexibility of installing the high efficiency gas furnace of the present invention. In accordance with the present invention the pipe or flexible exhaust tubing can be from ¼" to 1" in diameter and can be up to 80 feet long. The combination of the high velocity/super atmospheric products of combustion and the uniquely designed heat exchange system results in a compact design which can be ⅓ or less the size of conventional units and have efficiencies of over 95%.

The control/safety unit 32 contains those controls and safety devices normally found in commercial furnaces. These include a spark ignition, gas valve, flame sensing module which communicates and controls the gas control valve 44, a time delay for a system pre and post purging, a time delay for the air blower assembly system 30 which enables the residual heat energy to be put to useful work, a safety turn off for the air blower assembly system 30, and a thermostat temperature input control module to turn the apparatus on and off and to adjust the firing rate.

Air blower assembly system 30 is comprised of a motor driven blower assembly which draws air from the building or dwelling at 130 into the suction side of blower assembly 30 and pushes the air through a specially designed inlet 132 towards the encased combustion chamber 22 and heat exchanger system 24 to remove the heat energy and then exit this heated air at 134 to communicate with a duct system (not shown) which communicates with the various rooms within the building or dwelling enabling the heated air to be distributed to the space requiring heat. The unit can also be positioned such that exit 134 can direct the heated air flow directly into the space requiring heat. Air blower assembly 30 communicates and is controlled by the control/safety unit 32.

Central control unit 28 is a pre-programmed device which evaluates the environmental conditions and communicates with gas metering valve 44 and air metering valve 40 compressor 18 and air blower assembly 30, in order to modulate the firing rate and efficiently optimize the heating cycle while minimizing the number of on/off cycles the furnace must go through.

FIG. 4 shows one embodiment of burner assembly 35 used in the present invention and is illustrated as a burner which is formed of a gas permeable fiber metallic material 64. Suitable fiber metallic materials include Fercalloy a Registered Trademark of and available from U.K. Atomic Energy Authority, U.K., and Behifor, Bekinox, Bekitex and Bekitherm, all Registered Trademarks of and available from N. V. Behaert, S. A., Belgium. The fiber metallic material 64 is held in burner assembly 35 by a retainer 142 which is connected to the front plate 144 of combustion chamber 22. Ignitor 58 and flame sensor 60 are attached to combustion chamber 22 and are positioned in front of the fiber metallic burner surface to ignite the high velocity/super atmospheric premix emanating from the burner surface. The super atmospheric combustion phenomenon results in a faster rate of combustion reaction and a more complete combustion reaction such that the process produces less unwanted pollutants such as NOx.

FIG. 5 is directed to another embodiment of burner assembly 35 according to the present invention and is illustrated as a jet nozzle burner 66. Cylindrical jet nozzle burner 66 is connected to the combustion chamber front plate 150 of combustion chamber 22. The high velocity/super atmospheric premix is presented to burner 66 at inlet 152. The premix gasses travel through uniquely designed orifices arranged in a special pattern inside the burner and are presented to the ignitor 154 for ignition of the combustible premix. The jet flames emanating from the front opening 156 of burner 66 continues into combustion chamber 22. A flame sensor 158, a safety device, resides in front of jet nozzle burner front opening 156 to ensure ignition occurs and that a stable flame is present. Both of the above described burner designs result in a low pressure drop.

Figure 6:
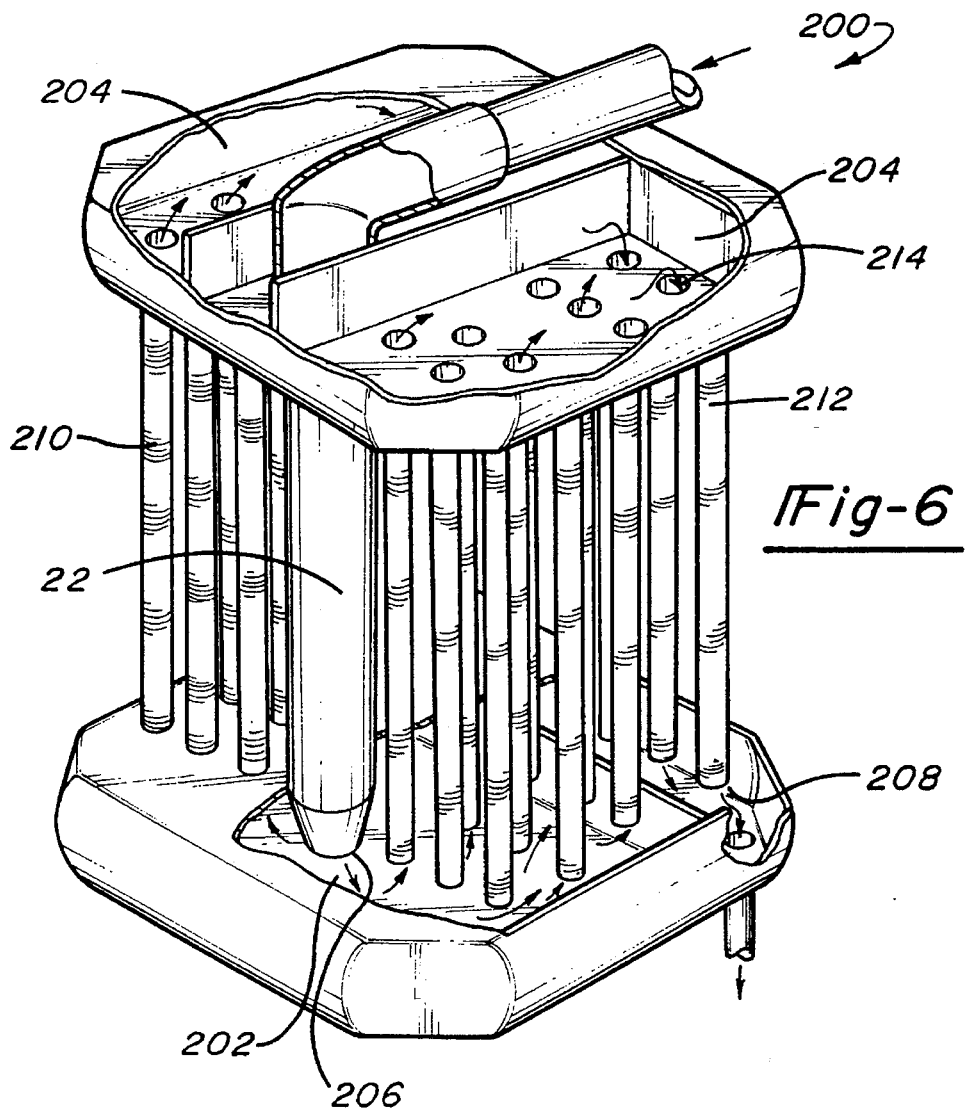
FIG. 6 is a partially cut away perspective view of a heat exchanger in accordance with another embodiment of the present invention.
Figure 6A:
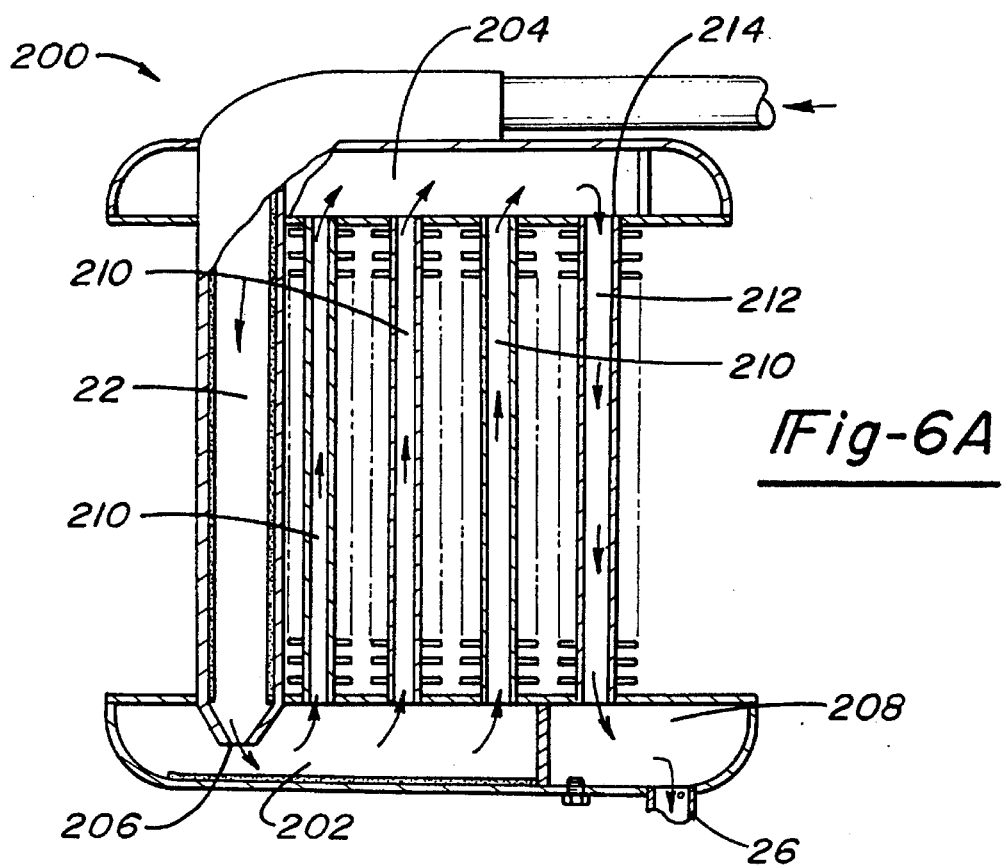
FIG. 6A is a side elevation cross section of the heat exchanger shown in FIG. 6.

FIG. 6 is a heat exchanger assembly according to another embodiment of the present invention and is designated by the reference numeral 200. In this design, heat exchanger sections 98 and 112 are replaced by heat exchanger section 204. Heat exchanger section 204 communicates with heat exchanger section 202 where the high velocity/super atmospheric products of combustion reside after exiting from combustion chamber 22. The high velocity/super atmospheric products of combustion enter heat exchanger section 202 at inlet 206 and travel upward to heat exchanger section 204 which communicates with heat exchanger section 202. Heat exchanger section 202 transports the high velocity/super atmospheric products of combustion via a series of finned or bared tubes/pipes 210. The high velocity/super atmospheric products of combustion transfer high convective heat to the tubes/pipes 210 where the forced air from the air blower assembly 30 passes over these tubes/pipes and picks up the heat energy. Heat exchanger section 204 also communicates with heat exchanger section 208 via a series of finned or bared tubes/pipes 212. Finned or bared tubes/pipes 212 communicate with heat exchanger section 204 at their inlet and heat exchanger section 208 at their outlet, the high velocity/super atmospheric products of combustion enter tubes/pipes 212 at inlet 214 and flow downward to heat exchanger section 208 and exit through exhaust system 26. The combination of the high velocity/super atmospheric products of combustion and the uniquely designed heat exchange system results in a compact design which can be ⅓ or less the size of conventional units and have efficiencies of over 95%.

Figure 7:
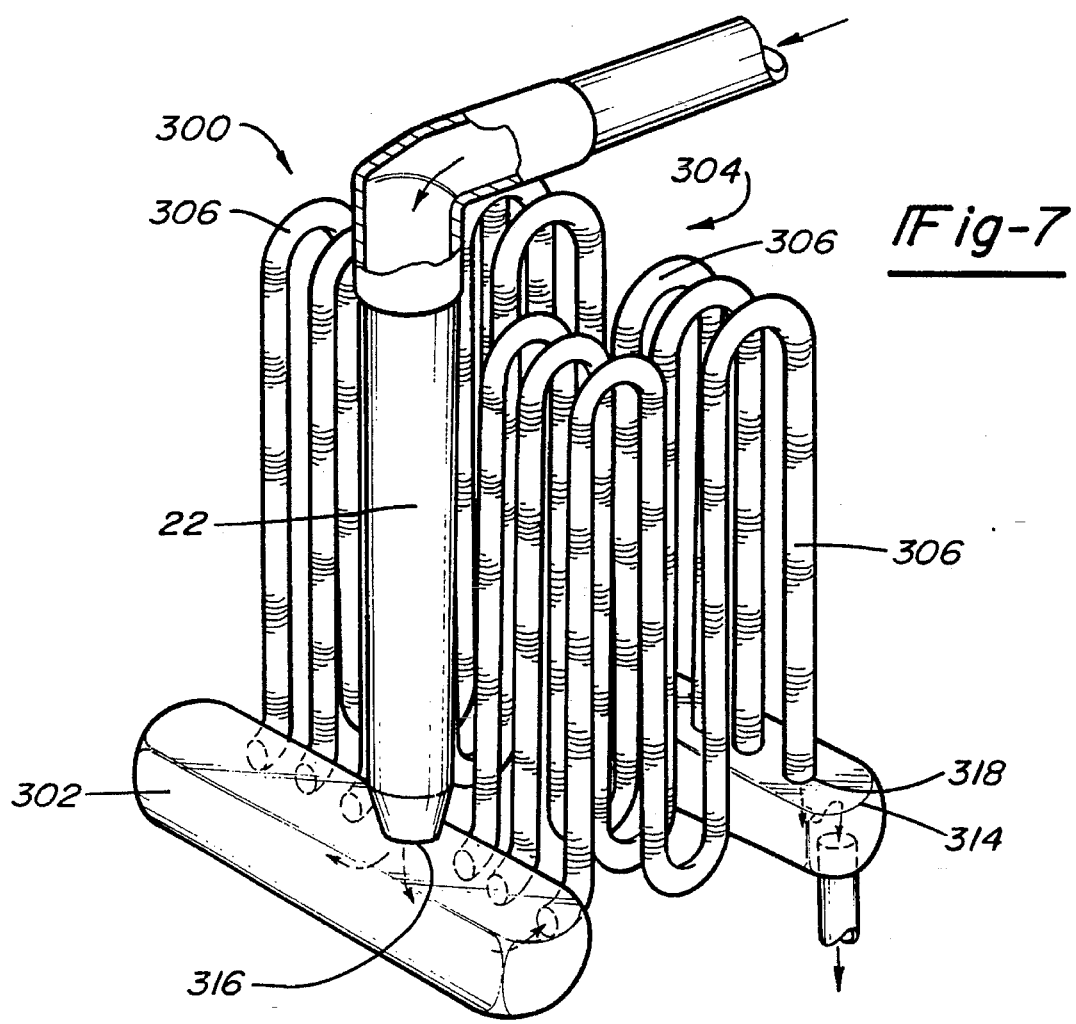
FIG. 7 is a perspective view of a heat exchanger in accordance with another embodiment of the present invention.
Figure 7A:
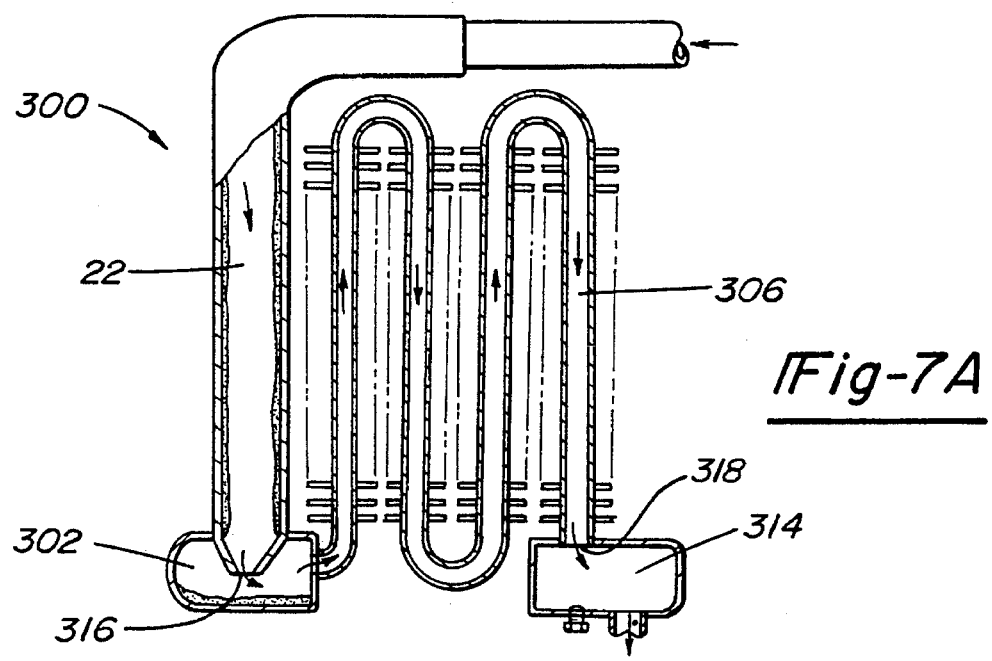
FIG. 7A is a side elevation cross section of the heat exchanger shown in FIG. 7.

FIG. 7 is a heat exchanger assembly according to another embodiment of the present invention and is designated by the reference numeral 300. In this design, heat exchanger section 302 is connected to combustion chamber 22 and is connected to heat exchanger section 304 which is comprised of a series of finned or bared tubes/pipes 306. Finned or bared tubes/pipes 306 proceed upward from heat exchanger section 302 then curve downward in an oscillating pattern from heat exchanger section 302 to a heat exchanger section 314. Finned or bared tubes/pipes 306 of heat exchanger section 304 are connected at their exit end to heat exchanger section 314. The high velocity/super atmospheric products of combustion flow into heat exchanger section 302 at inlet 316 and exit at 318 into heat exchanger section 314. The high convective heat transfer of the high velocity/super atmospheric products of combustion transfer heat energy into the finned or bared tubes/pipes 306 where the forced air flow from air blower assembly 30 picks up the heat energy in a highly efficient manner. The combination of the high velocity/super atmospheric products of combustion and the uniquely designed heat exchange system results in a compact design which can be ⅓ or less the size of conventional units and have efficiencies of over 95%.

Figure 8:
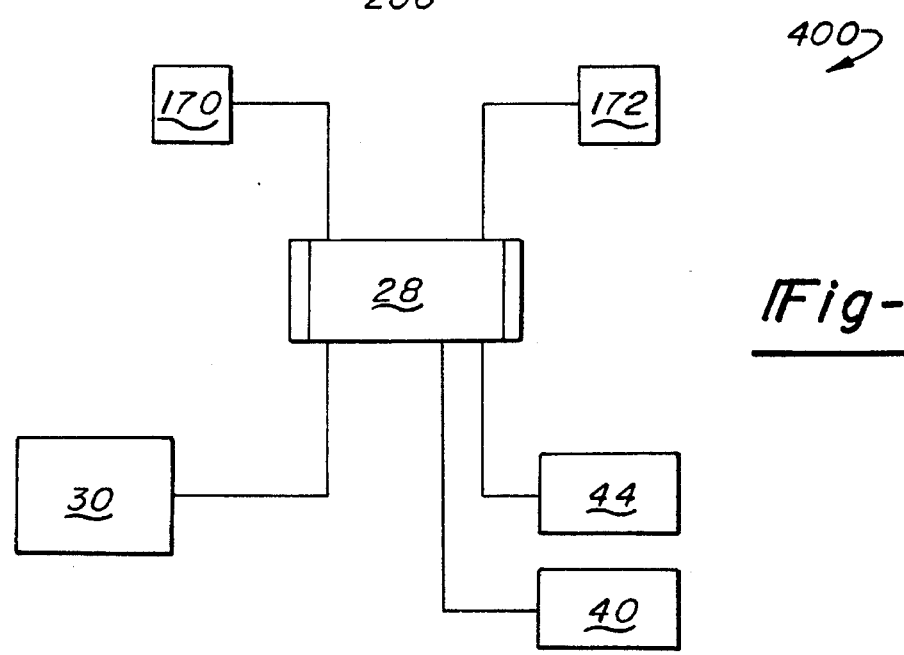
FIG. 8 is a schematic diagram of a control assembly for use with the furnace of the present invention.

FIG. 8 is a schematic diagram of a control assembly according to another embodiment of the present invention and is generally designated by the reference numeral 400. Central control unit 28 communicates with fuel gas control valve 44, air control valve 40 and air blower assembly 30. Central control unit 28 takes temperature readings from sensor 170 which resides in the building or dwelling and sensor 172 which resides outside the building or dwelling and evaluates this data based on pre-programs to determine the proper firing rate, blower motor speed and cycle time for the furnace to operate such that the space heating requirement is met in a highly efficient manner with a minimal number of furnace on-off cycles. This provides a more consistent temperature and higher comfort level within the heated space while increasing the life of the furnace.

Figure 8A:
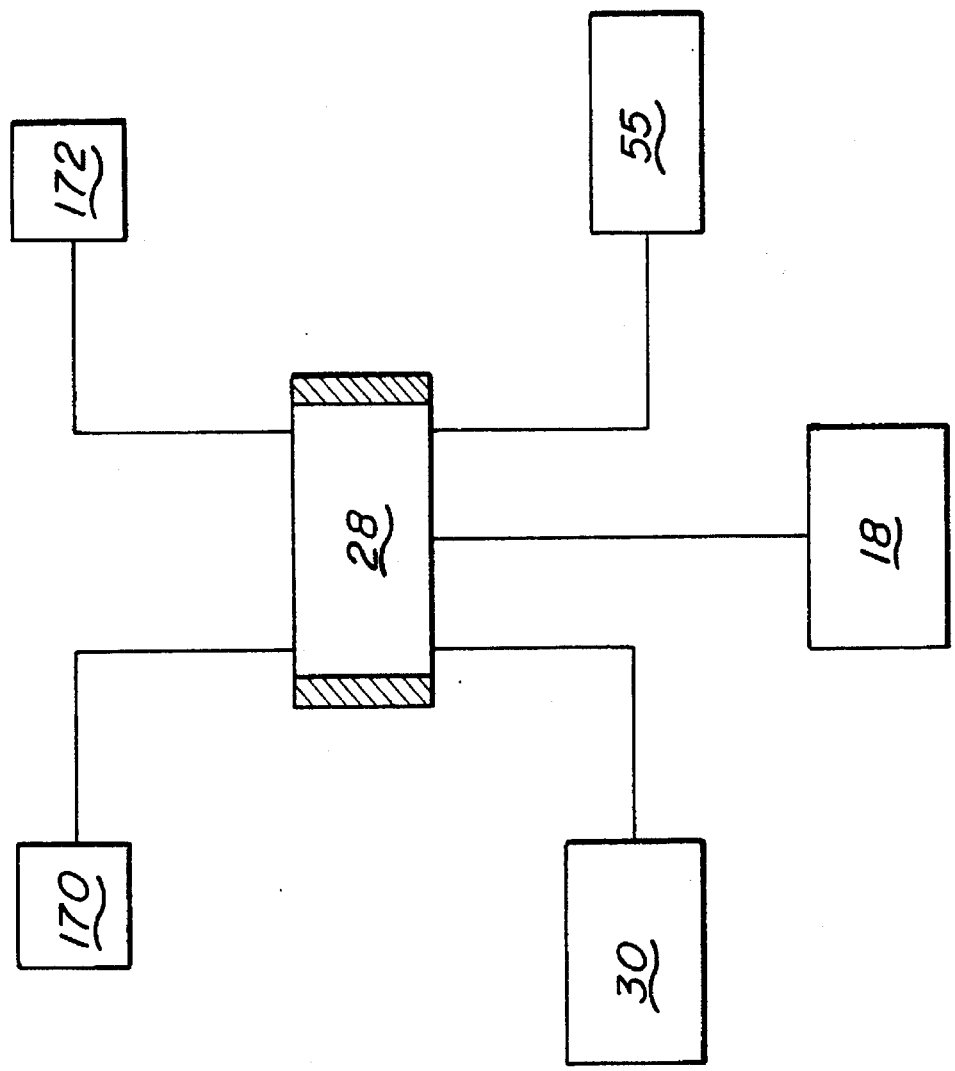
FIG. 8A is similar to FIG. 8 but shows a schematic diagram for use with another embodiment of the present invention.

FIG. 8A is similar to FIG. 8 except it shows a schematic of a control assembly 28 which communicates with compressor system 18, air blower assembly 30, and control 55. Control 55 is a combination of air control valve 40 and fuel gas control valve 44 which supply air and fuel gas to mixing unit 16 which in turn supplies the fuel gas and air premixture to compressor system 18. For this embodiment, central control unit 28 takes temperatures means from sensor 170 which resides inside the dwelling and temperature sensor 172 which resides outside the building and evaluates this data based on pre-programs to determine the proper firing rate, blower motor speed and cycle time for the furnace to operate such that the space heating requirement is met in a highly efficient manner with a minimal number of furnace on-off cycles. Similar to the control assembly described above in FIG. 8, this control system also provides a more consistent temperature and higher comfort level within the heated space while increasing the life of the furnace.

Figure 9:
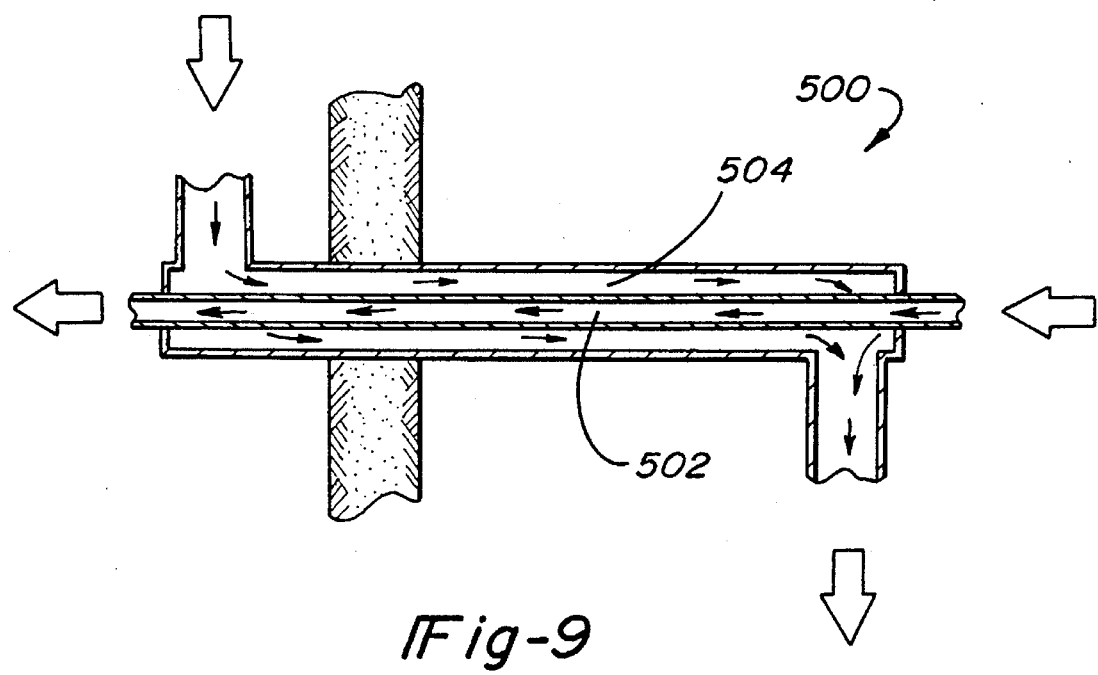
FIG. 9 is a longitudinal view partially in cross section of a recuperative exhaust system for use with the furnace of the present invention.

FIG. 9 shows a recuperative exhaust system according to another embodiment of the present invention and is generally designated by the reference numeral 500. The high velocity/super atmospheric products of combustion are exhausted through a small diameter pipe or tubing 502 to the outside of the building or dwelling. This small diameter exhaust pipe or tubing 502 resides inside a larger diameter pipe or tubing 504 which is used to draw in outside air for the combustion process. The cooler combustion air is preheated by the high velocity/super atmospheric products of combustion traveling through the small diameter exhaust pipe or tubing in a highly efficient manner as the high velocity products of combustion have a higher convective heat transfer rate than conventional exhaust. This design enables the furnace to achieve efficiency levels of greater than 97%.

Furnaces built according to the present invention which have a 50,000 BTU/HR rating occupy a rectangular space which measures 24"×14"×18". The central control unit is able to vary the firing rate of this 50,000 BTU/HR furnace from 30,000 BTU/HR to 70,000 BTU/HR while at the same time minimizing the number of on/off cycles.

FIG. 10 illustrates a combustion system 600 according to an additional embodiment of the present invention. The various embodiments of the present invention described above have all included burner assembly 35 and combustion chamber 22 located in a generally vertical position. While this orientation of burner assembly 35 and combustion chamber 22' has provided excellent operating results, it has been found that a horizontal positioning of burner assembly 35 and combustion chamber 22 provides even further advantages to the operation of high efficiency gas furnace 10.

Combustion system 600 comprises burner assembly 35, a combustion chamber 22' and a delivery tube 602. Combustion chamber 22' is similar to combustion chamber 22 in the embodiments described above but combustion chamber 22' does not include the layer of insulation 74. In some applications it has been found that insulation layer 74 is not required in order to ensure that the combustion process goes to completion in an efficient manner while producing a minimum level of documents. Combustion chamber 22' may be substituted for combustion chamber 22 in applications where insulation layer 74 is not required. Similar to the embodiments described above, the super atmospheric premix is supplied to burner system 20 via connection line 50 and communicates with burner assembly 35. Burner assembly 35 includes burner element 56, ignition source 58 for combusting the fuel gas/air premixture and safety flame sensor 60 to ensure that proper combustion occurs and is maintained. Burner assembly 35 operates by receiving and igniting the high velocity/pressurized gas premixture with minimal pressure loss through burner element 56. Burner assembly 35 comprises porous fiber metallic burner 64 or jet nozzle burner 66.

The high velocity flame emanating from burner assembly 35 will be contained and the combustion reaction will be allowed to go to completion within the cylindrically designed combustion chamber 22'. Combustion chamber 22' is preferably 2" to 5" in diameter depending on the designed firing rate range and the furnace configuration. For this embodiment, combustion chamber 22' is designed to be located horizontally within a gap 604 located in the middle of heat exchanger upper sections 98 and 112 shown in FIG. 3. Combustion chamber 22' may also be located horizontally within gap 604 located in the middle of heat exchanger section 204 shown in FIG. 6 or within gap 604 located in the middle of the upper end of finned or bared tubes/pipes 306 of heat exchanger 304 shown in FIG. 7. Combustion chamber 22' of combustion system 600 extends horizontally from the exit of heated air 134 towards the inlet 132 of air blower assembly system 30. Thus, the air being drawn from the building or dwelling at 130 is pushed through inlet 132 towards the end of combustion chamber 22' opposite to burner assembly 35 or the end attached to delivery tube 602 as shown by the arrow 606 shown in FIG. 10. In this way, the highest temperature portion of combustion chamber 22' meets the incoming air flow.

The end of combustion chamber 22' opposite to burner assembly 35 is mated to delivery tube 602. Delivery tube 602 is a serpentine tube which connects the output end of combustion chamber 22' with the input of a respective heat exchanger. For the heat exchanger shown in FIGS. 3 and 3A this would be heat exchanger lower section 82. For the heat exchanger shown in FIGS. 6 and 6A this would be heat exchanger section 204 and for the heat exchanger shown in FIGS. 7 and 7A this would be heat exchanger section 302. Delivery tube 602 winds its way from the front to the rear of gap 604 as it makes its way from combustion chamber 22' down to the respective heat exchanger.

The horizontal orientation of combustion system 600 provides better heat transfer as the highest temperature portion of combustion chamber 22' faces the cooler incoming air flow. In addition, the horizontal orientation of combustion chamber 22' in conjunction with delivery tube 602 offers better utilization of space within high energy furnace 10, restricts air flow between the opposite sides of the respective heat exchanger thus forcing air flow through the heat exchangers, and helps to minimize the temperature of the products of combustion which enter the respective heat exchanger. This minimization of the temperature of the products of combustion allows for the use of a more conventional and lower cost style of heat exchanger as the inlet temperature of the products of combustion are significantly lower.

Figure 11:
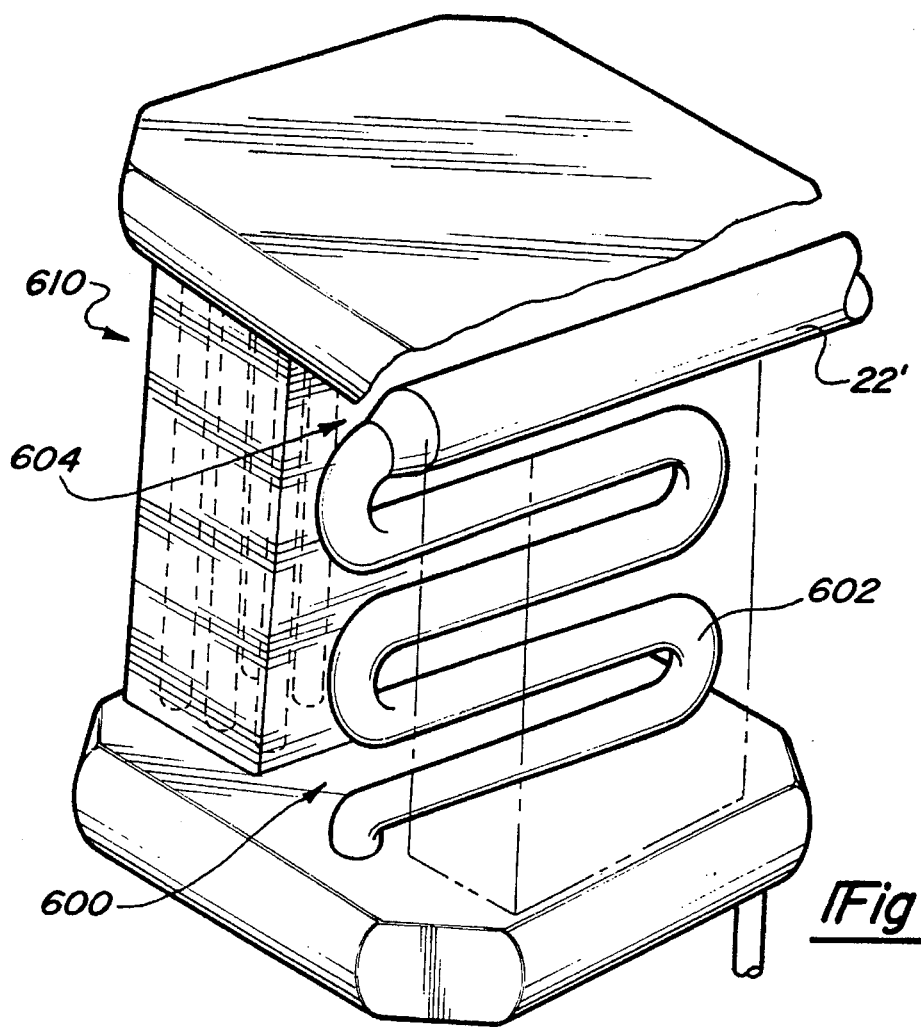
FIG. 11 is a partially cut away perspective view of the burner assembly shown in FIG. 10 combined with a heat exchanger in accordance with another embodiment of the present invention.

FIGS. 11 and 11A illustrate combustion system 600 combined with a heat exchanger 610 in accordance with another embodiment of the present invention. The high velocity products of combustion exiting combustion chamber 22' travel through delivery tube 602 and enter into section 612 of heat exchanger 610. The high convective heat transfer rate of the super atmospheric products of combustion transfer heat energy to the walls of section 612 which communicate with the forced air flow from air blower assembly 30. The high velocity products of combustion then travel up through a series of pipes 614. Pipes 614 communicate at their entrance end with heat exchanger section 612 and at their exit end with a heat exchanger section 616. The high velocity products of combustion then flow downward from heat exchanger section 616 into a second set of pipes 618 toward a heat exchanger section 620. The high velocity products of combustion then flow from heat exchanger section 620 upward through another set of pipes 622 to a heat exchanger section 624. The high velocity products of combustion then flow from heat exchanger section 624 downward through another set of pipes 626 to heat exchanger section 628. The high velocity products of combustion then flow from heat exchanger section 628 upward through still another set of pipes 630 to a heat exchanger section 632. Finally the high velocity products of combustion travel downward from heat exchanger section 632 towards a heat exchanger section 636 via a final set of pipes 634. Heat exchanger section 636 communicates with exhaust 26 for exiting the products of combustion to the outside atmosphere. The high convective heat transfer mechanism efficiently transfers the heat energy from the high velocity products of combustion to the walls of pipes 614, 618, 622, 626, 630 and 634 which in turn transfers the heat energy to the extended surfaces of a plurality of plates 640 interconnecting pipes 614, 618, 622, 626, 630 and 634. The heat energy is then efficiently transferred to the air flow emanating from air blower assembly 30 and moving through heat exchanger 610.

Figure 12:
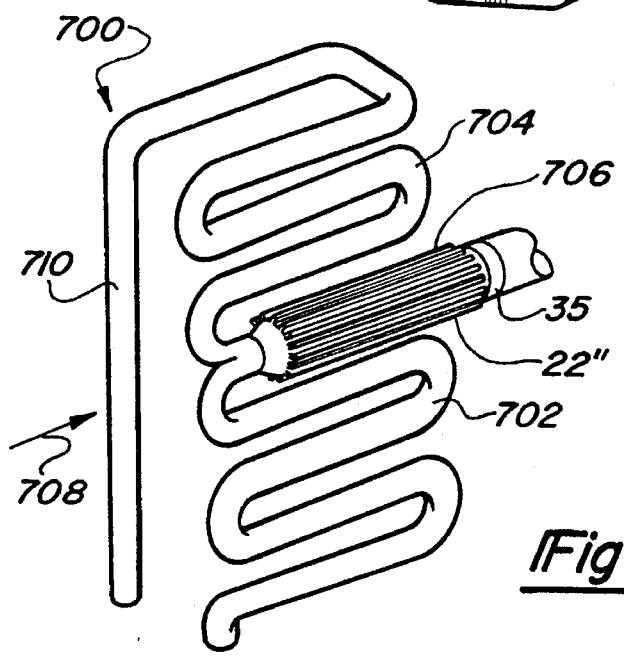
FIG. 12 is a perspective view of a burner assembly according to another embodiment of the present invention.

FIG. 12 illustrates a combustion system 700 according to an additional embodiment of the present invention which is especially suited to the higher firing rate furnaces. Combustion system 700 comprises burner assembly 35, a combustion chamber 22" and a pair of delivery tubes 702 and 704. Combustion chamber 22" is similar to combustion chamber 22' but with the addition of a plurality of circumferentially spaced fins 706 extending radially outward along the length of combustion chamber 22". The plurality of fins 706 aid in the transfer of heat energy from combustion chamber 22" to the incoming air flow from blower assembly 30 and thus the lowering of the temperature of the products of combustion entering the respective heat exchanger. Combustion chamber 22" may be substituted for combustion chamber 22 or combustion chamber 22' in applications where performance is increased with the use of combustion chamber 22". Similar to the embodiments described above, the super atmospheric premix is supplied to burner system 20 via connection line 50 and communicates with burner assembly 35. Burner assembly 35 includes burner element 56, ignition source 58 for combusting the fuel gas/air premixture and safety flame sensor 60 to ensure that proper combustion occurs and is maintained. Burner assembly 35 operates by receiving and igniting the high velocity/pressurized gas premixture with minimal pressure loss through burner element 56. Burner assembly 35 can comprise porous fiber metallic burner 64 or jet nozzle burner 66.

The high velocity flame emanating from burner assembly 35 will be contained and the combustion reaction will be allowed to go to completion within the cylindrically designed combustion chamber 22". Combustion chamber 22" is preferably 2" to 5" in diameter depending on the designed firing rate range and the furnace configuration. For combustion system 700, combustion chamber 22" is designed to be located horizontally within gap 604 similar to the design shown in FIG. 10. The design shown in FIG. 10 has combustion chamber 22" located in the middle of heat exchanger upper sections 98 and 112. Combustion system 700 shown in FIG. 12 is designed to have combustion chamber 22" located within gap 604 approximately one-half the way between the upper heat exchanger sections 98 and 112, and the lower heat exchanger sections 82, 102 and 114 shown in FIG. 3 and 3A. When used with heat exchanger assembly 200 shown in FIGS. 6 and 6A combustion chamber 22" of combustion system 700 is located within gap 604 approximately one-half the way between the upper heat exchanger section 204 and lower heat exchanger section 202. When used with heat exchanger system 300 shown in FIGS. 7 and 7A combustion chamber 22" of combustion system 700 is located within gap 604 approximately one-half the way between the upper end of tubes/pipes 306 and the lower heat exchanger section 302. When used with heat exchanger 610 as shown in FIGS. 11 and 11A combustion chamber 22" of combustion system 700 is located within gap 604 approximately one-half the way between the upper heat exchanger sections 616, 624 and 632, and the lower heat exchanger sections 612, 620, 628 and 636. Combustion chamber 22" extends horizontally from the exit of heated air 134 towards the inlet 132 of air blower assembly 30. Thus, the air being drawn from the building of dwelling at 130 is pushed through inlet 132 towards the end of combustion chamber 22" opposite to burner assembly 35 on the end attached to delivery tubes 702 and 704 as shown by the arrow 708 shown in FIG. 12. In this way, the highest temperature portion of combustion chamber 22 meets the incoming air flow.

The end of combustion chamber 22" opposite to burner assembly 35 is mated to delivery tubes 702 and 704. Delivery tube 702 is a serpentine tube which connects the output end of combustion chamber 22" with the input of a respective heat exchanger. Delivery tube 704 is also a serpentine tube extending in a direction opposite to delivery tube 702 and which also connects the output end of combustion chamber 22" with the input of the respective heat exchanger. For the heat exchanger shown in FIGS. 3 and 3A the output of delivery tubes 702 and 704 would be connected to heat exchanger lower section 82; for the heat exchanger section shown in FIGS. 6 and 6A the output of delivery tubes 702 and 704 would be connected to heat exchanger section 204; for the heat exchanger section shown in FIGS. 7 and 7A the output of delivery tubes 702 and 704 would be connected to heat exchanger section 302; and for the heat exchanger section shown in FIGS. 11 and 11A the output of delivery tubes 702 and 704 would be connected to heat exchanger section 612. Heat exchanger sections 82, 204, 302, 612, as well as the various other heat exchanger sections disclosed in the various embodiments, may be separated into two individual sections by a dividing plate such that delivery tubes 702 and 704 each feed one-half of the respective heat exchanger if desired. Both delivery tubes 702 and 704 wind their way from the front to the rear of gap 604 in opposite directions as they make their way from combustion chamber 22" to the respective heat exchanger. Delivery tue 704 has an additional vertical extension 710 in order to meet with the respective heat exchanger.

Similar to combustion system 600, combustion system 700 provides better heat transfer at the highest temperature portion of combustion chamber 22" faces the incoming air flow. Combustion system 700 is especially suited to the higher firing rate furnaces. The use of the plurality of fins 706 and two delivery tubes 702 and 704 allows for the transfer of a larger amount of the products of combustion and the associated heat transfer while still maintaining the compactness of design for combustion system 700. In addition, the horizontal orientation of combustion chamber 22" in conjunction with delivery tubes 702 and 704 offers better utilization of space within high energy efficient furnace 10, restricts air flow between the opposite sides of the respective heat exchanger thus forcing air flow through the heat exchangers, and helps to minimize the temperature of the products of combustion which enter the respective heat exchanger. This minimization of the temperature of the products of combustion allows for the use of a more conventional and lower cost style of heat exchanger as the inlet temperature of the products of combustion are significantly lower.

While the above detailed description describes the preferred embodiment of the present invention, it should be understood that the present invention is susceptible to modification, variation and alteration without deviating from this scope and fair meaning of the subjoined claims.

What is claimed is:

1. A clean burning gas flame furnace comprising:

a housing defining a combustion chamber;

burner means disposed within said housing for combusting a pressurized fuel gas and air premixture for providing heat, said pressurized fuel gas and air premixture being supplied to said burner means as a specified pressure greater than one PSIG;

a compressor for compressing a fuel gas and air premixture to provide said pressurized fuel gas and air premixture and introducing said pressurized premixture to said burner means at a specified velocity;

a mixing unit having a combustion air inlet and a fuel gas inlet, said mixing unit operable to create said fuel gas and air premixture, said mixing unit being in communication with said compressor;

means for supplying combustion air to said air inlet of said mixing unit;

means for supplying fuel gas to said fuel gas inlet of said mixing unit;

a heat exchanger in communication with said combustion chamber through at least one delivery tube, said heat exchanger comprising a plurality of tubes disposed generally perpendicular to said combustion chamber;

means for forcing air to flow over said heat exchanger such that heat is transferred to said forced air;

means for controlling the safe operation of said furnace by determining that proper combustion has occurred, said means for controlling the safe operation of said furnace communicating with said fuel gas supply means to control the supply of fuel gas to said mixing unit;

means for exhausting the high velocity products of combustion, said exhausting means being mated with said heat exchanger; and means for controlling the rate of combustion.

2. The furnace of claim 1 wherein said means for supplying combustion air comprises:

a control vane operable to shut off the combustion air supply to said mixing unit, said control valve being in communication with said controlling means and operable to vary the flow rate of said combustion air available to said mixing unit, said control valve disposed between said air inlet and said mixing unit.

3. The furnace of claim 1 wherein said burner means comprises:

a jet nozzle burner;

means for igniting said fuel gas and air premixture; and means for sensing said flame.

4. The furnace of claim 1 wherein said means for supplying fuel gas comprises:

a regulator to control the pressure of said fuel gas supply to said mixing unit, said regulator disposed between said fuel gas inlet and said mixing unit;

a control vane disposed between said regulator and said mixing unit, said control vane communicating with said regulator, said mixing unit and said control means and operable to vary the flow rate of said fuel gas to said mixing unit.

5. The furnace of claim 1 wherein said compressor has a suction side and a discharge side, said compressor communicating with said mixing unit on said suction side and said burner means on said discharge side to provide said pressurized premixture to said burner means.

6. The furnace of claim 1 wherein said burner means comprises a cylindrical shaped burner having means for igniting said pressurized premixture and wherein said heat exchanger further comprises a plurality of sections, said plurality of tubes serially interconnecting said plurality of sections, at least one of said plurality of sections communicating with said delivery tube and another of said plurality of sections communicating with said exhausting means.

7. The furnace of claim 1 wherein said heat exchanger further comprises a plurality of plates interconnecting said plurality of tubes.

8. The furnace of claim 1 wherein said heat exchanger comprises:

a bottom section defining a plurality of compartments; at least one of said compartments mated with said delivery tube and another of said compartments mated with said exhausting means;

a top section opposite to said bottom section and communicating with said bottom section, said plurality of tubes disposed between said bottom and top sections and interconnecting said bottom and said top sections such that the products of combustion follow a circuitous path from said combustion chamber to said exhausting means.

9. The furnace of claim 1 wherein said exhausting means comprises a valve and a pressure sensor located between said heat exchanger and an exhaust tube wherein said exhaust tube is less than 1 inch in diameter and communicates with the outside atmosphere.

10. The furnace of claim 1 wherein said combustion air inlet is connected to an intake tube wherein said intake tube is less than 1½ inches in diameter and communicates with the outside atmosphere.

11. The furnace of claim 1 wherein said exhausting means is integrated with said combustion air inlet such that the residual heat within said exhausting means can be transferred into the combustion air, said exhausting means residing inside said combustion air inlet, said combustion air inlet and said exhausting means splitting at said furnace and outside said room.

12. The furnace of claim 1 further comprising a condensate discharge system which comprises a control valve to allow for any condensate to be drained off, said condensate discharge system being mated to a bottom section of said heat exchanger such that said control valve will open when sufficient condensate accumulates to activate said control valve.

13. The furnace of claim 1 wherein said burner means comprises:

a fiber metallic burner;

means for igniting said fuel gas and air premixture; and means for sensing said flame.

14. The furnace of claim 1 wherein said specified pressure of said pressurized premixture is between one and fifteen PSIG.

15. The furnace of claim 1 wherein said means for controlling the rate of combustion comprises:

a central control unit; and means for storing a plurality of heating cycles, said storing means in communication with said central control unit such that said storing means provides information to said central control unit to control said rate of combustion.

16. The furnace of claim 1 wherein combusting said pressurized fuel gas and air premixture results in an accelerated rate of combustion reaction and a more complete combustion reaction such that very low levels of NOx are produced.

17. The furnace of claim 1 wherein said means for controlling the rate of combustion comprises:

a first temperature sensor for determining the temperature of outside air;

a second temperature sensor for determining the temperature of air inside said room;

a central control unit in communication with said means for supplying combustion air, said means for supplying fuel gas, said means for forcing air to flow, said exhausting means and said first and second temperature sensors such that both the firing rate of said burner means and the speed of said means for forcing air to flow are varied based upon said temperature of the outside air and said temperature of the inside air.

18. The furnace of claim 1 wherein said heat exchanger comprises:

a combustion manifold mated with said delivery tube; and an exhaust manifold mated with said exhausting means, said plurality of cylindrical tubes interconnecting said combustion manifold to said exhausting means.

19. The furnace of claim 1 wherein said combustion chamber is disposed generally parallel to said air flowing over said heat exchanger.

* * * * *

UNITED STATES PATENT AND TRADEMARK OFFICE
CERTIFICATE OF CORRECTION

PATENT NO. : 5,472,141

DATED : December 5, 1995

INVENTOR(S) : William E. Kraemer et al

It is certified that error appears in the above-identified patent and that said Letters Patent is hereby corrected as shown below:

Col. 1, Line 52, "Northern" should be --northern--

Col. 3, Line 39, "pans" should be --parts--

Col. 4, Line 1, "dean" should be --clean--

Col. 4, Line 32, "vane" should be --valve--

Col. 6, Line 22, insert --safety-- before "pressure"

Col. 6, Line 63, "valve 40" should be --valve 40,--

Col. 7, Line 4, "Fercalloy" should be --Fercalloy®--

Col. 7, Lines 6-7, "Behifor, Bekinox, Bekitex and Bekitherm" should be

--Behifor®, Bekinox®, Bekitex® and Bekitherm®--

UNITED STATES PATENT AND TRADEMARK OFFICE
CERTIFICATE OF CORRECTION

PATENT NO. : 5,472,141

DATED : December 5, 1995

INVENTOR(S) : William E. Kraemer et al

It is certified that error appears in the above-identified patent and that said Letters Patent is hereby corrected as shown below:

Col. 9, Line 13, "chamber 22' " should be --chamber 22--

Col. 9, Line 15, "chamber 22" should be --chamber 22'--

Col. 11, Line 33, "FIG." should be --FIGS.--

Col. 11, Line 54, "chamber 22" should be --chamber 22"--

Col. 12, Line 15, "tue" should be --tube--

Col. 12, Line 19, "at" should be --as--

Col. 13, Line 10, Claim 1, after "and" insert paragraph break

Col. 13, Line 14, Claim 2, "vane" should be --valve--

Col. 13, Line 31, Claim 4, "vane" should be --valve--

Col. 13, Line 32, Claim 4, "vane" should be --valve--

Signed and Sealed this

Second Day of July, 1996

*Attest:*

BRUCE LEHMAN

*Attesting Officer*     *Commissioner of Patents and Trademarks*